(12) United States Patent
Shimizu et al.

(10) Patent No.: US 8,581,567 B2
(45) Date of Patent: Nov. 12, 2013

(54) CONTROLLING SWITCHING REGULATOR UNDER LIGHT LOAD CONDITIONS

(75) Inventors: Shinya Shimizu, Hyogo (JP); Yuusuke Michishita, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 999 days.

(21) Appl. No.: 12/469,967

(22) Filed: May 21, 2009

(65) Prior Publication Data

US 2009/0302820 A1 Dec. 10, 2009

(30) Foreign Application Priority Data

Jun. 10, 2008 (JP) ................................. 2008-151779

(51) Int. Cl.
G05F 1/565 (2006.01)
G05F 1/575 (2006.01)

(52) U.S. Cl.
USPC .......................................... 323/285; 323/283

(58) Field of Classification Search
USPC ................................. 323/282–285
See application file for complete search history.

(56) References Cited

U.S. PATENT DOCUMENTS 5,912,552 A  6/1999 Tateishi
6,369,561 B1 * 4/2002 Pappalardo et al. .......... 323/285
7,498,785 B2  3/2009 Shimizu et al.
2008/0068869 A1  3/2008 Shimizu
2008/0079405 A1  4/2008 Shimizu
2008/0169793 A1  7/2008 Okuda et al.
2008/0278129 A1 11/2008 Shimizu

FOREIGN PATENT DOCUMENTS

| JP | 4-42771 | 2/1992 |
| JP | 10-225105 | 8/1998 |
| JP | 2006-166667 | 6/2006 |
| JP | 2007-174884 | 7/2007 |
| JP | 2008-283807 | 11/2008 |

OTHER PUBLICATIONS

Japanese official action dated May 21, 2013 in corresponding Japanese patent application No. 2008-151779.

* cited by examiner

*Primary Examiner* — Adolf Berhane
*Assistant Examiner* — Nusrat Quddus
(74) *Attorney, Agent, or Firm* — Cooper & Dunham LLP (57) ABSTRACT

In a switching regulator, a peak current value of an inductor current iL corresponding to a critical current is obtained by {(Vin−Vout)/Vin×Vout/L×Ts}, where Ts is the frequency of clock signals CLK constituting set pulses generated at predetermined timings by an oscillating circuit 9. Accordingly, by setting a reference voltage VLL as (Vout/L×Ts/rs), the peak current value of the inductor current iL when the load current has decreased is set to be the peak current value of the inductor current iL corresponding to the critical current. Therefore, simply by setting the reference voltage VLL in advance, the peak current of the inductor current iL when the load current has decreased is set to be the peak current value of the inductor current iL corresponding to the critical current.

17 Claims, 6 Drawing Sheets

CONTROLLING SWITCHING REGULATOR UNDER LIGHT LOAD CONDITIONS

BACKGROUND

1. Technical Field

This disclosure relates to a technology of controlling a switching regulator constituting a DC-DC converter, and more particularly to a technology of controlling the switching regulator under light load conditions.

2. Description of the Related Art

The recent years have witnessed the increasing pervasiveness of compact mobile devices such as mobile phones. A compact secondary battery is used as the power source of such a compact mobile device. In order to reduce the size of the secondary battery and to maximize the usage time, attempts have been made to increase the performance of secondary batteries and to provide devices with higher energy saving capabilities.

The efficiency of a switching regulator constituting a DC-DC converter is an important factor in increasing the energy saving capabilities of a device. Typically, this efficiency is expressed by a function of the output current flowing to the load. The loss generated in accordance with the operation of the switching regulator accounts for a high percentage of the total power loss. Accordingly, the efficiency of the switching regulator declines when the load is light.

Conventionally, there have been many proposed techniques for improving the efficiency of a switching regulator under light load conditions. For example, to reduce the switching loss under light load conditions, there has been proposed a switching regulator that intermittently drives a PWM control circuit which is a control circuit for a duty cycle, under light load conditions (see, for example, patent document 1).

In this switching regulator, a predetermined upper limit voltage threshold and a predetermined lower limit voltage threshold are set. In the event that the output power is lower than the predetermined lower limit voltage threshold, the switch control circuit is configured to be turned off while the output voltage exceeds the lower limit voltage threshold.

When the output capacitor is discharged to a lower voltage level than the lower limit voltage threshold, the switch control circuit is activated once again, and causes the switch element to perform switching at a regular duty cycle, until the output voltage exceeds the upper limit voltage threshold. Subsequently, the switch control circuit stops operating until the output voltage falls below the lower limit voltage threshold. Accordingly, the output voltage is maintained within a range that is defined by the upper limit voltage threshold and the lower limit voltage threshold. These operations are repeatedly performed while the output power to the load is lower than the predetermined threshold. However, once the output power exceeds the predetermined threshold, the switching operation is resumed at a regular duty cycle. With such a configuration, the switching loss can be reduced under light load conditions, thereby improving the efficiency of the switching regulator.

Figure 6:
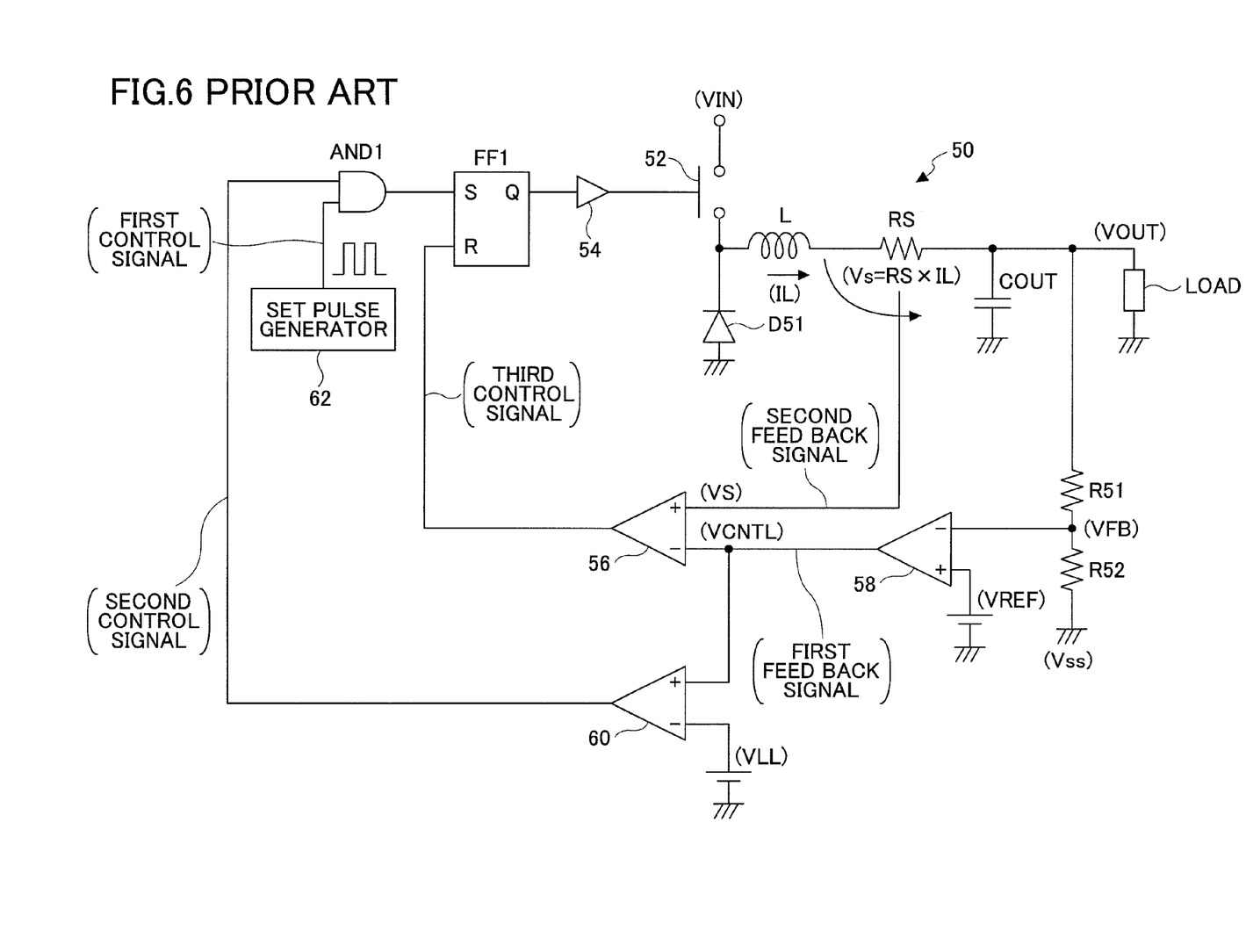
FIG. 6 illustrates a circuit example of a conventional step-down switching regulator.

FIG. 6 illustrates a circuit example of a conventional step-down switching regulator (see, for example, patent document 2).

The switching regulator shown in FIG. 6 has two feedback paths. The first feedback path uses a voltage VCNTL of a first feedback signal indicating a target maximum inductor current for maintaining an output voltage VOUT at a predetermined level. The voltage VCNTL of the first feedback signal is generated by comparing, with the use of an error amplifier 58, a division voltage VFB, which is obtained by dividing an output voltage VOUT with the use of a voltage dividing circuit including voltage dividing resistors R51 and R52, and a reference voltage VREF.

In the second feedback path, a voltage VS of a second feed back signal, which is a voltage between both ends of a sense resistor RS (=voltage VS of second feed back signal/inductor current IL), is detected. A comparator 56 compares the voltage VS of the second feedback signal and the voltage VCNTL of a first feedback signal. The comparator 56 generates a reset signal for achieving a cutoff status in which a switch 52 is turned off by resetting an RS flip-flop FF1, in the event that the voltage VS of the second feedback signal is higher than the voltage VCNTL of the first feedback signal. Preferably, the RS flip-flop FF1 operates in such a manner as to prioritize a reset input signal over a set input signal.

When the load current decreases, the voltage VCNTL of the first feedback signal drops below a light load reference voltage VLL, the output of a comparator 60 changes from a high level to a low level, and an AND circuit AND 1 outputs a low level signal. In such a light load condition, the current that flows from an output capacitor COUT to a load LOAD is significantly smaller than the current that flows by one inductor pulse. Therefore, the voltage VCNTL of the first feedback signal is maintained at a lower level than that of the light load reference voltage VLL, even after subsequent set signals have been generated by a set pulse generator 62. Accordingly, the output signals of the comparator 60 are maintained at a low level, and the RS flip-flop FF1 is maintained in a status where it is not set. Then, as the output voltage VOUT slowly declines and the voltage VCNTL of the first feedback signal exceeds the light load reference voltage VLL, the comparator 60 outputs a high-level signal. Accordingly, the RS flip-flop FF1 is set by the set pulse generated by the set pulse generator 62.

Subsequently, when the voltage VS of the second feedback signal becomes higher than the voltage VCNTL of the first feedback signal, the RS flip-flop FF1 is reset. With this process, the switching frequency of the switch 52 becomes low, so that high efficiency can be achieved even under light load conditions. This process cycle is repeated as long as the load is light. Furthermore, this process decreases the process frequency of the switch 52 when the load is light. Accordingly, the switching loss and driving loss of a power MOSFET can be reduced.

Patent Document 1: Japanese Laid-Open Patent Application No. H4-42771

Patent Document 2: Japanese Laid-Open Patent Application No. H10-225105

However, in the switching regulator for performing PWM control with the use of two feedback paths for the output voltage and the inductor current as illustrated in FIG. 6, it is known that the stability of the loop is degraded under conditions where the duty cycle exceeds 50%. Therefore, in order for the switching regulator to operate in a stable manner under any input/output condition, a small extent of slope compensation is preferably made on the internal loop.

In order to make such a slope compensation in the circuit shown in FIG. 6, a slope voltage needs to be added to the voltage VCNTL of the first feedback signal, or a slope voltage needs to be subtracted from the voltage VS of the second feedback signal. Furthermore, to achieve an appropriate slope voltage, the slope voltage needs to be a value greater than or equal to ½ (50%) of that of the down slope of the inductor (slope when switch is closed).

That is, the slope required for the circuit shown in FIG. 6 needs to be larger than (output voltage/inductance value× resistance value of sense resistor RS/2). Accordingly, in the event that the slope compensation is performed on the circuit shown in FIG. 6, the slope of the inductor current IL increases depending on the input voltage, when the switch 52 is turned on and in a conductive status. Therefore, under light load conditions, the peak current of the inductor current IL varies depending on the input voltage.

If the peak current of the inductor current IL is too low under light load conditions, the oscillatory frequency that is determined by the load increases, and the switching loss increases, thereby degrading the efficiency. Conversely, if the peak current is too high under light load conditions, the output current is larger than the current required for maintaining the output voltage VOUT at a predetermined value, thereby increasing ripples of the output voltage VOUT. Accordingly, under light load conditions, the peak current of the inductor current IL is preferably the peak current corresponding to a critical current.

SUMMARY OF THE INVENTION

In an aspect of this disclosure, there is provided a switching regulator for implementing control by performing slope compensation, whereby the switching regulator has two feedback paths for the output voltage and the inductor current. The switching regulator is capable of maintaining high efficiency even under light load conditions in which the load requires low current, without the need of adding a circuit for controlling the peak current of the inductor current. Furthermore, the switching regulator is capable of reducing ripples of the output voltage.

According to another aspect, there is provided a switching regulator for converting an input voltage input to an input terminal into a predetermined constant voltage and outputting the predetermined constant voltage as an output voltage from an output terminal, the switching regulator including a first switch element configured to perform a first switching operation so as to be turned on/off according to a first control signal that has been input; an inductor configured to be charged by the input voltage according to the first switching operation of the first switch element; a rectification element configured to discharge the inductor in the event that the first switch element is turned off and the inductor stops being charged; an error amplifying circuit unit configured to amplify a voltage difference between a predetermined reference voltage and a proportional voltage that is proportional to the output voltage, and to output an amplified voltage corresponding to the amplified voltage difference; an inductor current detecting circuit unit configured to detect an inductor current flowing to the inductor, generate an inductor voltage in accordance with the detected inductor current, and output the generated inductor voltage; a slope voltage generating circuit unit configured to generate and output a slope voltage having a slope that is specified in advance; and a switching control circuit unit configured to add the slope voltage to the inductor voltage output from the inductor current detecting circuit unit to obtain an added voltage, compare the added voltage with the amplified voltage output from the error amplifying circuit unit to obtain a comparison result, generate a pulse signal of a duty cycle corresponding to the comparison result, and control the first switching operation of the first switch element according to the pulse signal, wherein the slope voltage generating circuit unit generates and outputs the slope voltage having the slope that is inversely proportional to a slope of the inductor current detected while the first switch is turned off and in a cutoff status.

According to another aspect, there is provided a switching regulator for converting an input voltage input to an input terminal into a predetermined constant voltage and outputting the predetermined constant voltage as an output voltage from an output terminal, the switching regulator including a first switch element configured to perform a first switching operation so as to be turned on/off according to a first control signal that has been input; an inductor configured to be charged by the input voltage according to the first switching operation of the first switch element; a rectification element configured to discharge the inductor in the event that the first switch element is turned off and the inductor stops being charged; an error amplifying circuit unit configured to amplify a voltage difference between a predetermined reference voltage and a proportional voltage that is proportional to the output voltage, and to output an amplified voltage corresponding to the amplified voltage difference; an inductor current detecting circuit unit configured to detect an inductor current flowing to the inductor, generate an inductor voltage in accordance with the detected inductor current, and output the generated inductor voltage; a slope voltage generating circuit unit configured to generate and output a slope voltage having a slope that is specified in advance; and a switching control circuit unit configured to add the slope voltage to the amplified voltage output from the erroramplifying circuit unit to obtain an added voltage, compare the added voltage with the inductor voltageoutput from the inductor current detecting circuitunit to obtain a comparison result, generate a pulsesignal of a duty cycle corresponding to thecomparison result, and control the first switching operation of the first switch element according to the pulse signal, wherein the slope voltage generating circuit unit generates and outputs the slope voltage having the slope that is proportional to a slope of the inductor current detected while the first switch is turned off and in a cutoff status.

According to another aspect, a switching regulator is provided, which has two feedback paths. A slope voltage having a slope that is inversely proportional to a slope of the inductor current detected while a first switch is turned off and in a cutoff status. Therefore, the switching regulator is capable of maintaining high efficiency even under light load conditions in which the load requires low current, without the need of adding a circuit for controlling the peak current of the inductor current. Furthermore, the switching regulator is capable of reducing ripples of the output voltage.

BRIEF DESCRIPTION OF THE DRAWINGS

The aforementioned and other aspects, features and advantages would be better understood from the following detailed description when read in conjunction with the accompanying drawings, in which.

DETAILED DESCRIPTION OF THE PREFERRED EMBODIMENTS

Figure 1:
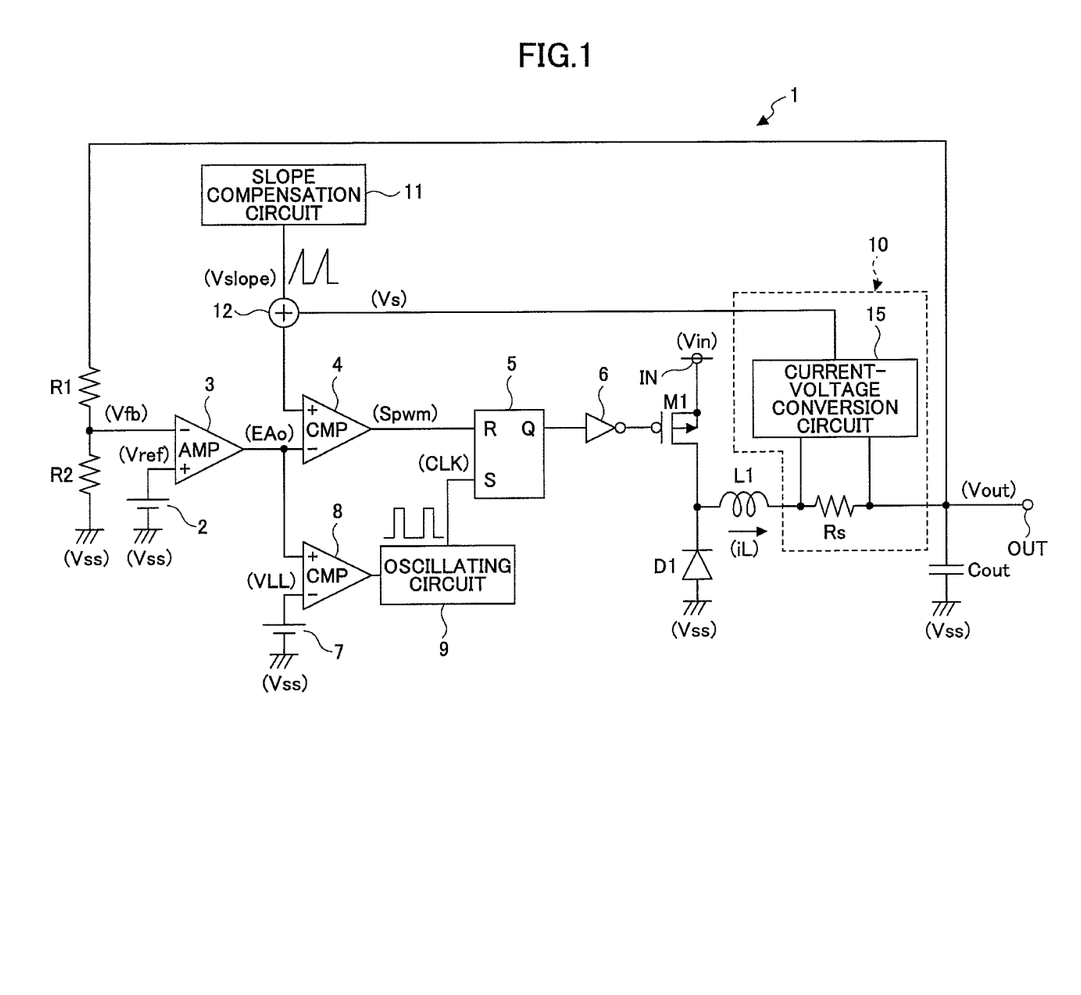
FIG. 1 illustrates a circuit example of a switching regulator according to a first embodiment of the present invention.

A description is given, with reference to the accompanying drawings, of embodiments of the present invention.
<First Embodiment>
FIG. 1 illustrates a circuit example of a switching regulator according to a first embodiment of the present invention.

As shown in FIG. 1, a switching regulator 1 constitutes a step-down switching regulator employing an asynchronous rectification method, which steps down an input voltage Vin which has been input to an input terminal IN to a predetermined constant voltage, and outputs this voltage as an output voltage Vout from an output terminal OUT.

The switching regulator 1 includes a switching transistor M1 constituting a PMOS transistor, configured to perform a switching operation to implement output control of the input voltage Vin. The switching regulator 1 also includes a diode D1 constituting a flywheel diode for rectification.

The switching regulator 1 includes a reference voltage generating circuit 2 for generating a predetermined reference voltage Vref, resistors R1 and R2 for detecting the output voltage, an inductor L1, an output capacitor Cout, an error amplifying circuit 3, a PWM comparator 4, an RS flip-flop 5, an inverter 6, a reference voltage generating circuit 7 for generating and outputting a predetermined reference voltage VLL, and a comparator 8. Furthermore, the switching regulator 1 includes an oscillating circuit 9 for generating and outputting a predetermined clock signal CLK, an inductor current detecting circuit 10 for detecting an inductor current iL flowing in the inductor L1 and for generating and outputting a voltage Vs in accordance with the detected inductor current iL, a slope compensation circuit 11 for generating and outputting a slope voltage Vslope constituting predetermined saw-tooth wave signals, and an adding circuit 12. The inductor current detecting circuit 10 includes a sense resistor Rs for detecting an inductor current, and a current-voltage conversion circuit 15 for generating and outputting a voltage Vs in accordance with the current that flows from the voltage between both ends of the sense resistor Rs to the sense resistor Rs, i.e., the inductor current iL.

The switching transistor M1 constitutes a first switch element; the diode D1 constitutes a rectification element; the reference voltage generating circuit 2, the error amplifying circuit 3, and the resistors R1 and R2 configure an error amplifying circuit unit; the inductor current detecting circuit 10 constitutes an inductor current detecting circuit unit; the slope compensation circuit 11 constitutes a slope voltage generating circuit unit; and the PWM comparator 4, the RS flip-flop 5, the inverter 6, the reference voltage generating circuit 7, the comparator 8, the oscillating circuit 9, and the adding circuit 12 configure a switching control circuit unit. In the switching regulator 1, all of the circuits except for the inductor L1 and the capacitor Cout can be integrated into a single IC. In another case, all of the circuits except for the switching transistor M1 and/or the diode D1, the inductor L1, and the capacitor Cout can be integrated into a single IC.

The switching transistor M1 is connected between the input terminal IN and the cathode of the diode D1, and the anode of the diode D1 is connected to a ground voltage Vss. The inductor L1 and the sense resistor Rs are connected in series in between the output terminal OUT and the connection part of the switching transistor M1 and the diode D1. The resistors R1 and R2 are connected in series in between the output terminal OUT and a ground voltage Vss. Also, the output capacitor Cout is connected between the output terminal OUT and the ground voltage Vss. A division voltage Vfb is output from the connection part between the resistors R1 and R2. In the error amplifying circuit 3, the division voltage Vfb is input to the inverting input terminal, and the reference voltage Vref is input to the noninverting input terminal. The error amplifying circuit 3 amplifies the voltage difference between the division voltage Vfb and the reference voltage Vref to generate an error voltage EAo, and outputs the error voltage EAo to the inverting input terminal of the PWM comparator 4.

Both terminals of the sense resistor Rs are connected to the current-voltage conversion circuit 15. The current-voltage conversion circuit 15 generates the voltage Vs from the voltage between both ends of the sense resistor Rs, and outputs the voltage Vs. The adding circuit 12 receives the slope voltage Vslope from the slope compensation circuit 11 and the voltage Vs from the current-voltage conversion circuit 15. The adding circuit 12 adds the slope voltage Vslope and the voltage Vs together, and outputs the resultant voltage to the noninverting input terminal of the PWM comparator 4. The PWM comparator 4 compares the error voltage EAo from the error amplifying circuit 3 with the voltage output from the adding circuit 12, generates pulse signals Spwm for performing PWM control, and outputs the pulse signals Spwm to the reset input terminal R of the RS flip-flop 5. The error voltage EAo is input to the noninverting input terminal of the comparator 8, and the reference voltage VLL is input to the inverting input terminal of the comparator 8. The output terminal of the comparator 8 is connected to the oscillating circuit 9. The clock signals CLK output from the oscillating circuit 9 are input to the set input terminal S of the RS flip-flop 5, and the output terminal Q of the RS flip-flop 5 is connected to the gate of the switching transistor M1 via the inverter 6.

In such a configuration, the set input terminal S of the RS flip-flop 5 receives the clock signals CLK, and the RS flip-flop 5 is set in accordance with the rise or the fall of the clock signals CLK, such that the output terminal Q is switched to a high level. The reset input terminal R of the RS flip-flop 5 receives the pulse signals Spwm from the PWM comparator 4. After the RS flip-flop 5 is set, the RS flip-flop 5 is reset by a pulse signal Spwm from the PWM comparator 4, such that the output terminal Q is switched to a low level. The signal level of the signal output from the output terminal Q of the RS flip-flop 5 is inverted at the inverter 6, and then the signals are input to the gate of the switching transistor M1.

When the output voltage Vout of the switching regulator 1 is increased, the error voltage EAo from the error amplifying circuit 3 is decreased, and the duty cycle of the pulse signals Spwm from the PWM comparator 4 is decreased. This consequently decreases the time during which the switching transistor M1 is turned on, so that the output voltage Vout from the switching regulator 1 is decreased.

When the output voltage Vout from the switching regulator 1 is decreased, the error voltage EAo from the error amplifying circuit 3 is increased, and the duty cycle of the pulse signals Spwm from the PWM comparator 4 is increased. This consequently increases the time during which the switching transistor M1 is turned on, so that the output voltage Vout from the switching regulator 1 is increased. These operations are repeated so that the output voltage Vout is maintained at a predetermined level.

The diode D1 functions as a rectification element. When the switching transistor M1 is turned off so as to be in a cutoff status, the diode D1 causes the inductor current iL to freewheel, and prevents the inductor current iL from flowing to the ground voltage Vss. When the switching transistor M1 is turned on, the inductor current iL flows to the output terminal OUT through the sense resistor Rs, so that the inductor current iL is supplied to a load (not shown) connected to the output terminal OUT. The output capacitor Cout stores the power supplied from the inductor L1, and supplies a current to the load when there is no inductor current iL supplied to the load from the inductor L1.

The switching regulator 1 shown in FIG. 1 is provided with two feedback paths. In the first feedback path, the error voltage EAo is used as the first feedback signal indicating the target maximum inductor current for maintaining the output voltage Vout at a predetermined value. The second feedback uses, as the second feedback signal, the voltage Vs obtained from the voltage between both ends of the sense resistor Rs. Assuming that the resistance value of the sense resistor Rs is rs, rs=Vs/iL is satisfied. In the adding circuit 12, the voltage Vs is added to the slope voltage Vslope output from the slope compensation circuit 11.

The slope $\Delta$Vslope/$\Delta$t of the slope voltage Vslope is defined by a function of (rs×Vout/L), where L is the inductance of the inductor L1. Specifically, the slope $\Delta$Vslope/$\Delta$t is inversely proportional to the slope of the inductor current iL when the switching transistor M1 is turned off, and moreover, the $\Delta$Vslope/$\Delta$t is set to have the same ratio as that when generating the voltage Vs. Furthermore, at least while the switching transistor M1 is turned on, the voltage Vs is added to the slope voltage Vslope.

When the voltage obtained by adding the voltage Vs to the slope voltage Vslope exceeds the error voltage EAo, the PWM comparator 4 resets the RS flip-flop 5, and generates a reset signal for turning off the switching transistor M1. The RS flip-flop 5 preferably operates in such a manner as to prioritize signals of the reset input terminal R over the signals of the set input terminal S.

The comparator 8 compares the error voltage EAo with the reference voltage VLL, and outputs a signal expressing a time constant determined by the status of the load. When the error voltage EAo is lower than the reference voltage VLL, the comparator 8 outputs a low-level signal. When the low-level signal is received from the comparator 8, the oscillating circuit 9 stops outputting clock signals CLK, and the set input terminal S of the RS flip-flop 5 is fixed to a low level. Accordingly, the RS flip-flop 5 is set at lower frequencies compared to the case of a regular status.

When the error voltage EAo becomes greater than or equal to the reference voltage VLL while the switching regulator 1 is operating under regular conditions, the output signals of the comparator 8 are maintained at a high level. As a result, the oscillating circuit 9 outputs set pulses generated at predetermined timings to the set input terminal S of the RS flip-flop 5. The switching transistor M1 is turned on in accordance with an output signal from the RS flip-flop 5. When the switching transistor M1 is turned on, the inductor L1 is connected to the input terminal IN, and the current that flows in through the inductor L1 increases linearly.

Next, the PWM comparator 4 compares the voltage output from the adding circuit 12 with the error voltage EAo. When the voltage output from the adding circuit 12 exceeds the error voltage EAo, the PWM comparator 4 outputs a high-level signal to reset the RS flip-flop 5, and the switching transistor M1 is turned off. As a result, a freewheeling current flows through the diode D1, and the inductor current iL starts to decrease. Subsequently, when a high-level set pulse is input from the oscillating circuit 9, the RS flip-flop 5 is set once again, and the switching transistor M1 is turned on. This process is repeatedly performed during regular operations.

When the load current output from the output terminal OUT is decreased, the error voltage EAo drops below the reference voltage VLL. Accordingly, the output signals from the comparator 8 change from high-level to low-level, such that the oscillating circuit 9 outputs low-level signals. Under such light load conditions, the load current that flows from the output capacitor Cout to the load is sufficiently lower than the inductor current iL which flows every time the switching transistor M1 is turned on. Accordingly, the error voltage EAo is maintained at a lower level than the reference voltage VLL even when the oscillating circuit 9 is outputting high-level clock signals CLK. Accordingly, the output signals from comparator 8 are maintained at low-level, such that the RS flip-flop 5 is not set.

When the output voltage Vout slowly declines and the error voltage EAo exceeds the reference voltage VLL, the output signals from the comparator 8 become high-level. Accordingly, the RS flip-flop 5 is set by a high-level clock signal CLK output from the oscillating circuit 9. In this process, the switching frequency of the switching transistor M1 decreases, and therefore switching loss and driving loss of the switching transistor M1 can be reduced, thereby achieving high efficiency even under light load conditions. This process cycle is repeated as long as the load is light.

When the load current has decreased, the peak current value of the inductor current iL is determined by the amount of inductor current iL that increases from when the switching transistor M1 is turned on until the switching transistor M1 is turned off. The switching transistor M1 is turned on and turned off in the above-described manner, and therefore, when the load current has decreased, the peak current value of the inductor current iL becomes substantially equal to the amount of the inductor current iL that increases until the output voltage from the adding circuit 12 exceeds the reference voltage VLL. Accordingly, while the voltage Vs is (rs× iL), the slope $\Delta$Vslope/$\Delta$t of the slope voltage Vslope is defined as (rs×Vout/L). Therefore, the peak current value of the inductor current iL when the load current has decreased is obtained by (Vin−Vout)/Vin×VLL×rs).

Assuming that Ts is the frequency of the clock signals CLK that configure the set pulses that are generated by the oscillating circuit 9 at predetermined timings, the peak current value of the inductor current iL corresponding to the critical current is obtained by {(Vin−Vout)/Vin×Vout/L×Ts}. Accordingly, by setting the reference voltage VLL at (Vout/ L×Ts/rs), the peak current of the inductor current iL when the load current has decreased can be set to the peak current value of the inductor current iL corresponding to the critical current.

The following advantage can be achieved by setting, in advance, the output voltage Vout, the inductance L, the frequency Ts of the set pulse, and the resistance value of the sense resistor Rs. That is, simply by setting, in advance, the reference voltage VLL (without the need to control the reference voltage VLL), the peak current of the inductor current iL when the load current has decreased can be set to the peak current value of the inductor current iL corresponding to the critical current.

Figure 2:
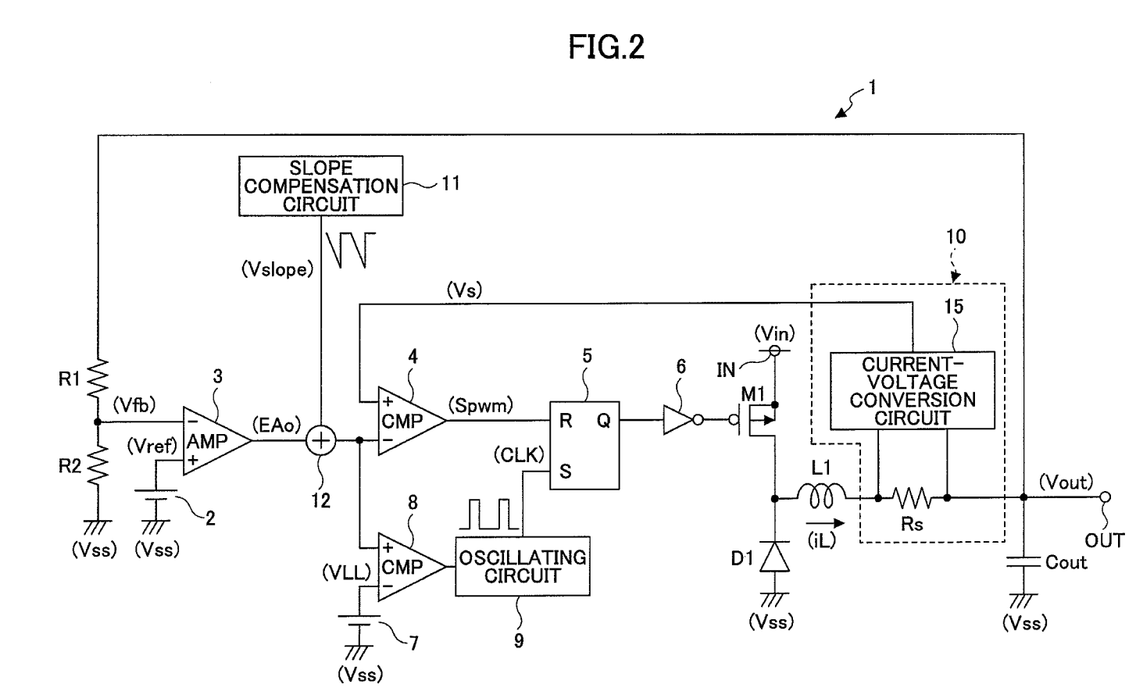
FIG. 2 illustrates another circuit example of the switching regulator according to the first embodiment of the present invention.

In FIG. 1, the slope voltage Vslope is added to the voltage Vs. In another case, as shown in FIG. 2, the slope voltage Vslope can be added to the error voltage EAo. In this case, the voltage obtained by adding the slope voltage Vslope to the error voltage EAo is compared with the voltage Vs by the PWM comparator 4. While the voltage Vs is (rs×iL), the slope $\Delta$Vslope/$\Delta$t of the slope voltage Vslope is defined as {rs×(− Vout/L)}. Otherwise, the operations and the effects are basically the same as those described with reference to FIG. 1.

In FIGS. 1 and 2, the sense resistor Rs is connected between the inductor L1 and the output terminal OUT. However, the sense resistor Rs may be connected between the input terminal IN and the switching transistor M1. In this case, the configuration shown in FIG. 1 will have the configuration shown in FIG. 3. The same is applicable to FIG. 2, and redundant descriptions are omitted.

Figure 3:
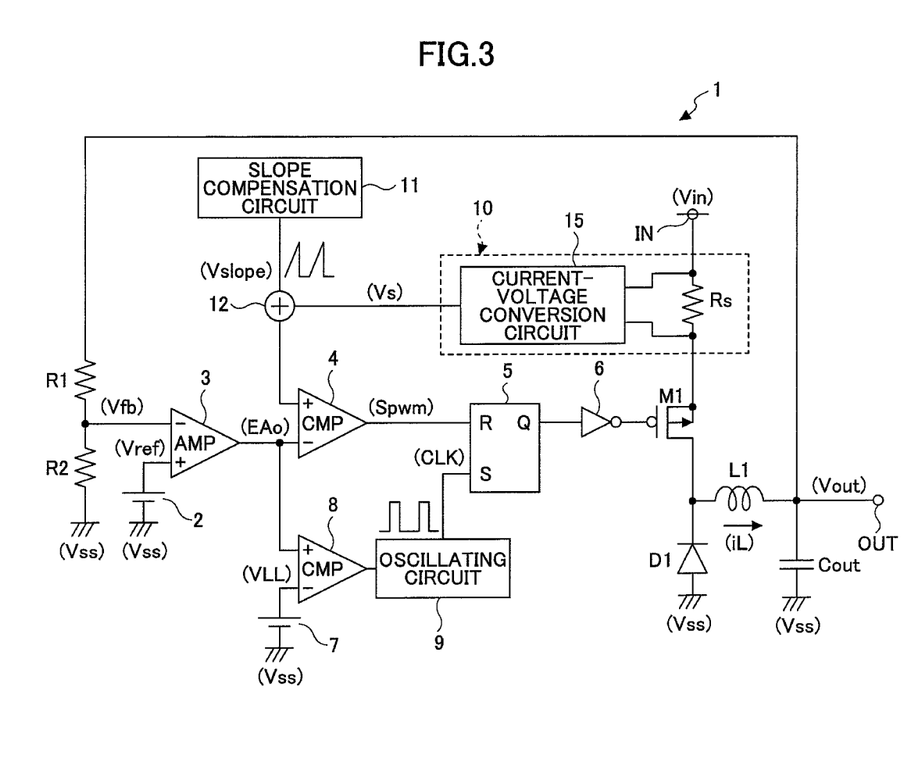
FIG. 3 illustrates yet another circuit example of the switching regulator according to the first embodiment of the present invention.

With reference to FIG. 3, the RS flip-flop 5 is set by a clock signal CLK generated by the oscillating circuit 9, and the switching transistor M1 is turned on. The voltage obtained by adding together the voltage Vs and the slope voltage Vslope is compared with the error voltage EAo by the PWM comparator 4. When the output voltage of the adding circuit 12 exceeds the error voltage EAo, the PWM comparator 4 outputs high-level signals Spwm for resetting the RS flip-flop 5, and turns off the switching transistor M1.

Accordingly, the voltage Vs is required when the switching transistor M1 is turned on. The same characteristics as those of the switching regulator 1 shown in FIG. 1 can be achieved by connecting the sense resistor Rs to the source of the switching transistor M1 in which a current is flowing when the switching transistor M1 is turned on.

The current flows to the sense resistor Rs only when the switching transistor M1 is turned on. Therefore, the loss at the sense resistor Rs can be reduced, and the efficiency can be improved. Instead of using the sense resistor Rs, the on resistance of the switching transistor M1 may be used. In this case, the loss at the sense resistor Rs can be eliminated, and the efficiency can be improved even more.

<Second Embodiment>

In the first embodiment, a switching regulator employing an asynchronous rectification method is taken as an example. The present invention is also applicable to a switching regulator employing a synchronous rectification method with which the power conversion efficiency can be improved. A second embodiment according to the present invention has such a configuration.

Figure 4:
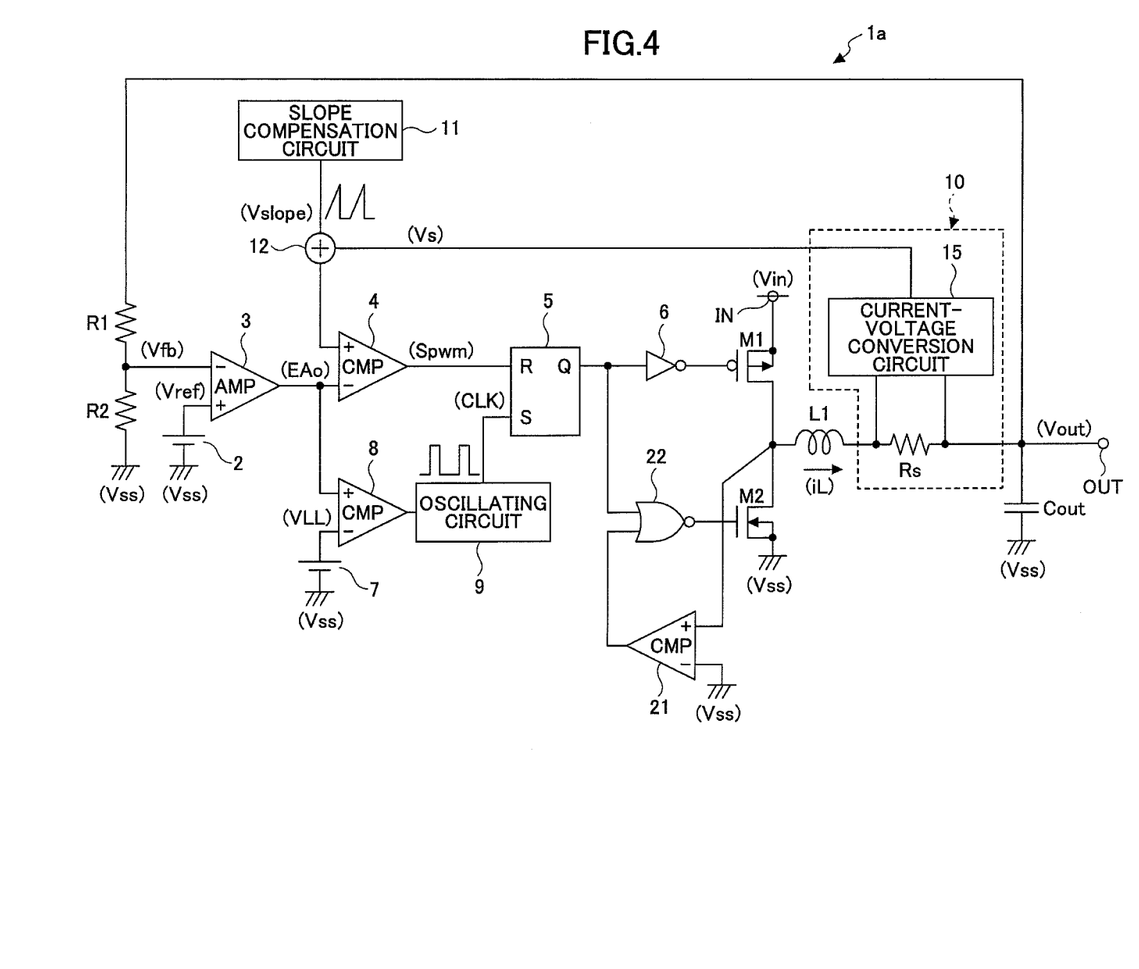
FIG. 4 illustrates a circuit example of a switching regulator according to a second embodiment of the present invention.

FIG. 4 illustrates a circuit example of a switching regulator according to the second embodiment of the present invention. In FIG. 4, elements corresponding to those in FIG. 1 are denoted by the same reference numbers, and are not further described. Only the different elements are described below.

The difference between FIG. 4 and FIG. 1 is that the circuit shown in FIG. 4 includes a synchronous rectification transistor M2 instead of the diode D1; a comparator 21 for detecting and preventing a reverse current, whereby the reverse current occurs when the inductor current iL flows from the output terminal OUT to the synchronous rectification transistor M2; and a NOR circuit 22 that generates control signals for the synchronous rectification transistor M2. Accordingly, the switching regulator 1 of FIG. 1 is denoted by a reference numeral 1a in FIG. 4.

In FIG. 4, the switching regulator 1a constitutes a step-down switching regulator employing a synchronous rectification method that steps down an input voltage Vin which has been input to an input terminal IN, to a predetermined constant voltage, and outputs this voltage as an output voltage Vout from an output terminal OUT.

The switching regulator 1a includes the switching transistor M1 and the synchronous rectification transistor M2 constitutes an NMOS transistor.

The switching regulator 1a includes the reference voltage generating circuit 2, the resistors R1 and R2, the inductor L1, the output capacitor Cout, the error amplifying circuit 3, the PWM comparator 4, the RS flip-flop 5, the inverter 6, the reference voltage generating circuit 7, and the comparator 8. Furthermore, the switching regulator 1a includes the oscillating circuit 9, the inductor current detecting circuit 10, the slope compensation circuit 11, the adding circuit 12, the comparator 21, and the NOR circuit 22.

The synchronous rectification transistor M2 constitutes a second switch element; the PWM comparator 4, the RS flip-flop 5, the inverter 6, the reference voltage generating circuit 7, the comparator 8, the oscillating circuit 9, the adding circuit 12, and the NOR circuit 22 configure a switching control circuit unit; and the comparator 21 and the NOR circuit 22 configure a reverse current preventing circuit unit. Furthermore, in the switching regulator 1a, all of the circuits except for the inductor L1 and a capacitor Cout can be integrated into a single IC. In another case, all of the circuits except for the switching transistor M1 and/or the synchronous rectification transistor M2, the inductor L1, and the capacitor Cout can be integrated into a single IC.

The synchronous rectification transistor M2 is connected in between the drain of the switching transistor M1 and the ground voltage Vss, and the gate of the synchronous rectification transistor M2 is connected to the output terminal of the NOR circuit 22. The noninverting input terminal of the comparator 21 is connected to the connection part of the switching transistor M1 and the synchronous rectification transistor M2. The inverting input terminal of the comparator 21 is connected to the ground voltage Vss. One of the input terminals of the NOR circuit 22 is connected to the output terminal of the comparator 21, and the other input terminal of the NOR circuit 22 is connected to the output terminal Q of the RS flip-flop 5.

In such a configuration, the synchronous rectification transistor M2 is controlled by a reversed phase with respect to the switching transistor M1, in such a manner as to accurately trace the function of the diode D1 shown in FIG. 1. That is, when the switching transistor M1 is turned off (when the RS flip-flop 5 is reset), the synchronous rectification transistor M2 is turned on, and the inductor current iL flows from the ground voltage Vss through the synchronous rectification transistor M2. The comparator 21 compares the voltage at the connection part of the synchronous rectification transistor M2 and the inductor L1, with the ground voltage Vss. The comparator 21 outputs low-level signals when the RS flip-flop 5 outputs low-level signals such that the switching transistor M1 is turned off and the synchronous rectification transistor M2 is turned on, and the inductor current iL flows toward the output terminal OUT through the synchronous rectification transistor M2. When the comparator 21 is outputting low-level signals, the NOR circuit 22 outputs, to the gate of the synchronous rectification transistor M2, signals having the same level as that of the signals output from the RS flip-flop 5.

Meanwhile, the comparator 21 outputs high-level signals when it detects a reverse current or an indication of a reverse current, whereby the reverse current occurs when the inductor current iL flows toward the ground voltage Vss through the synchronous rectification transistor M2 even though low-level signals are being output from the RS flip-flop 5. In this case, the NOR circuit 22 outputs low-level signals regardless of the output signals from the RS flip-flop 5, to turn off the synchronous rectification transistor M2. This operation prevents the reverse current from the output capacitor Cout, and further improves the efficiency. Otherwise, the operations are the same as those of the circuit shown in FIG. 1, and are thus not further described. FIG. 4 is described by taking FIG. 1 as an example. The same is applicable to FIGS. 2 and 3, and redundant descriptions are omitted.

Figure 5:
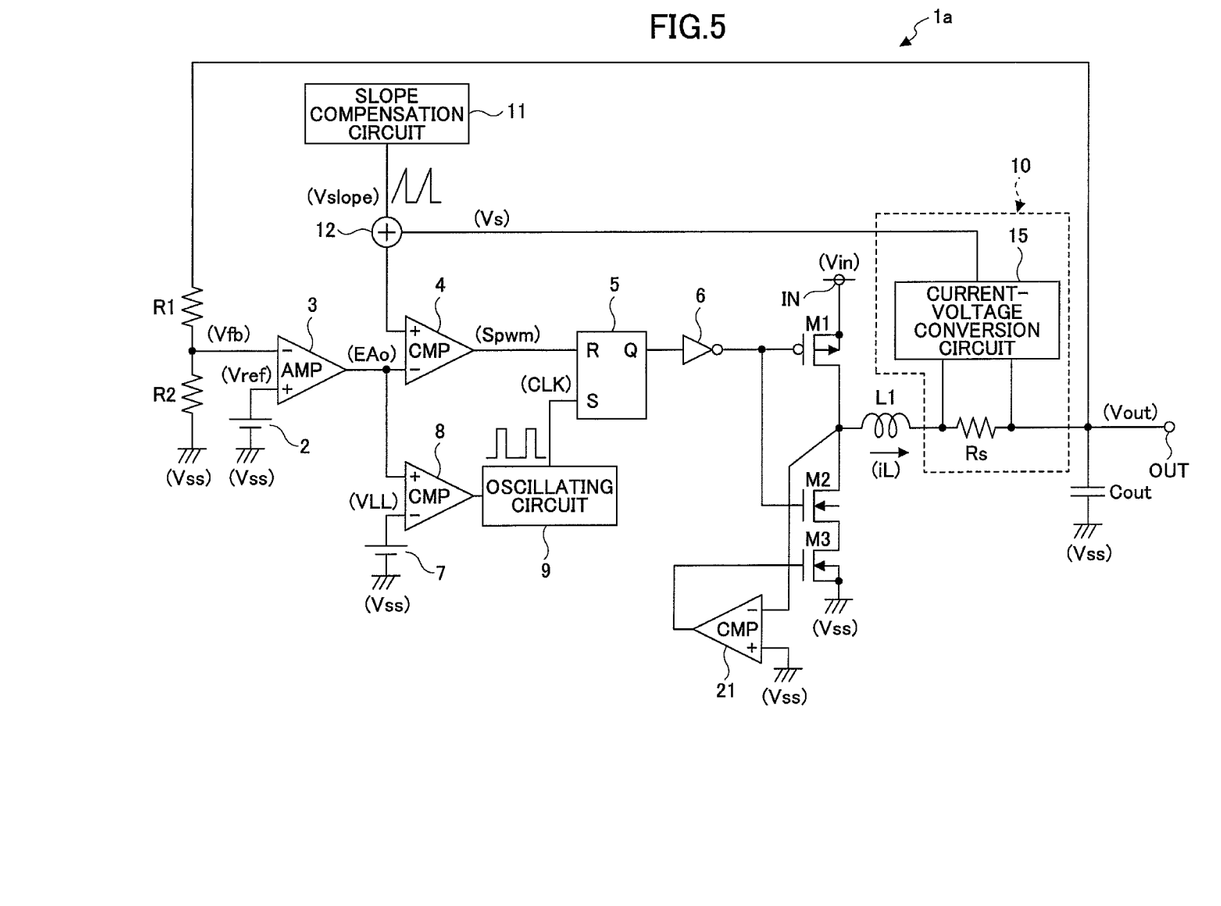
FIG. 5 illustrates another circuit example of the switching regulator according to the second embodiment of the present invention.

As described with reference to FIG. 4, when the comparator 21 detects a reverse current or an indication of a reverse current, the synchronous rectification transistor M2 is turned off. However, it is possible to prevent such a reverse current by turning off a switch that is connected in series with the synchronous rectification transistor M2. In this case, the configuration shown in FIG. 4 will have the configuration shown in FIG. 5. In FIG. 5, elements corresponding to those in FIG. 4 are denoted by the same reference numbers, and are not further described. Only the different elements are described below.

The difference between FIG. 5 and FIG. 4 is that the circuit shown in FIG. 5 does not include the NOR circuit 22, and includes an NMOS transistor M3 constituting the above-described switch. The NMOS transistor M3 and the comparator 21 configure a reverse current preventing circuit unit; the NMOS transistor M3 constitutes a third switch element; and the comparator 21 constitutes a reverse current detecting circuit. In FIG. 5, all of the circuits except for the inductor L1 and the capacitor Cout can be integrated into a single IC. In another case, all of the circuits except for the switching transistor M1, the synchronous rectification transistor M2 and/or the NMOS transistor M3, the inductor L1, and the capacitor Cout can be integrated into a single IC.

In FIG. 5, the gate of the synchronous rectification transistor M2 is connected to the output terminal of the inverter 6, and the NMOS transistor M3 is connected in between the source of the synchronous rectification transistor M2 and the ground voltage Vss. The gate of the NMOS transistor M3 is connected to the output terminal of the comparator 21. The noninverting input terminal of the comparator 21 is connected to the ground voltage Vss and the inverting input terminal of the comparator 21 is connected to the connection part of the synchronous rectification transistor M2 and the inductor L1. The synchronous rectification transistor M2 is controlled by a reversed phase with respect to the switching transistor M1, in such a manner as to accurately trace the function of the diode D1 shown in FIG. 1. That is, when the switching transistor M1 is turned off (when the RS flip-flop 5 is reset), the synchronous rectification transistor M2 is turned on, and the inductor current iL flows from the ground voltage Vss toward the output terminal OUT through the synchronous rectification transistor M2.

The comparator 21 outputs high-level signals when the RS flip-flop 5 outputs low-level signals such that the switching transistor M1 is turned off and the synchronous rectification transistor M2 is turned on, and the inductor current iL flows toward the output terminal OUT through the synchronous rectification transistor M2. When the comparator 21 is outputting high-level signals, the NMOS transistor M3 is turned on, so as to be in a conductive status.

Meanwhile, the comparator 21 outputs low-level signals when the inductor current iL flows toward the ground voltage Vss through the synchronous rectification transistor M2 even though low-level signals are being output from the RS flip-flop 5. In this case, the NMOS transistor M3 is turned off so as to be in a cutoff status, thereby cutting off a current flowing toward the ground voltage Vss through the synchronous rectification transistor M2. This operation prevents the reverse current from the output capacitor Cout, and further improves the efficiency. Otherwise, the operations are the same as those of the circuit shown in FIG. 1, and are thus not further described. FIG. 5 is described by taking FIG. 1 as an example. The same is applicable to FIGS. 2 and 3, and redundant descriptions are omitted.

The present invention is not limited to the specifically disclosed embodiment, and variations and modifications may be made without departing from the scope of the present invention.

The present application is based on Japanese Priority Patent Application No. 2008-151779, filed on Jun. 10, 2009, the entire contents of which are hereby incorporated herein by reference.

What is claimed is:

1. A switching regulator for converting an input voltage input to an input terminal into a predetermined constant voltage and outputting the predetermined constant voltage as an output voltage from an output terminal, the switching regulator comprising:

a first switch element configured to perform a first switching operation so as to be turned on/off according to a first control signal that has been input;

an inductor configured to be charged by the input voltage according to the first switching operation of the first switch element;

a rectification element configured to discharge the inductor in the event that the first switch element is turned off and the inductor stops being charged;

an error amplifying circuit unit configured to amplify a voltage difference between a predetermined reference voltage and a proportional voltage that is proportional to the output voltage, and to output an amplified voltage corresponding to the amplified voltage difference;

an inductor current detecting circuit unit configured to detect an inductor current flowing to the inductor, generate an inductor voltage in accordance with the detected inductor current, and output the generated inductor voltage;

a slope voltage generating circuit unit configured to generate and output a slope voltage having a slope that is specified in advance; and a switching control circuit unit configured to add the slope voltage to the inductor voltage output from the inductor current detecting circuit unit to obtain an added voltage, compare the added voltage with the amplified voltage output from the error amplifying circuit unit to obtain a comparison result, generate a pulse signal of a duty cycle corresponding to the comparison result, and control the first switching operation of the first switch element according to the pulse signal, wherein:

the slope voltage generating circuit unit generates and outputs the slope voltage having the slope that is inversely proportional to a slope of the inductor current detected while the first switch is turned off and in a cutoff status.

2. A switching regulator for converting an input voltage input to an input terminal into a predetermined constant voltage and outputting the predetermined constant voltage as an output voltage from an output terminal, the switching regulator comprising:

a first switch element configured to perform a first switching operation so as to be turned on/off according to a first control signal that has been input;

an inductor configured to be charged by the input voltage according to the first switching operation of the first switch element;

a rectification element configured to discharge the inductor in the event that the first switch element is turned off and the inductor stops being charged;

an error amplifying circuit unit configured to amplify a voltage difference between a predetermined reference voltage and a proportional voltage that is proportional to the output voltage, and to output an amplified voltage corresponding to the amplified voltage difference;

an inductor current detecting circuit unit configured to detect an inductor current flowing to the inductor, generate an inductor voltage in accordance with the detected inductor current, and output the generated inductor voltage;

a slope voltage generating circuit unit configured to generate and output a slope voltage having a slope that is specified in advance; and a switching control circuit unit configured to add the slope voltage to the amplified voltage output from the error amplifying circuit unit to obtain an added voltage, compare the added voltage with the inductor voltage output from the inductor current detecting circuit unit to obtain a comparison result, generate a pulse signal of a duty cycle corresponding to the comparison result, and control the first switching operation of the first switch element according to the pulse signal, wherein:

the slope voltage generating circuit unit generates and outputs the slope voltage having the slope that is proportional to a slope of the inductor current detected while the first switch is turned off and in a cutoff status.

3. The switching regulator according to claim 1, wherein:
the inductor current detecting circuit unit comprises
a sense resistor that is connected such that the inductor current flows therethrough, and
a current-voltage conversion circuit configured to generate the inductor voltage in accordance with the inductor current, based on a voltage between both ends of the sense resistors and output the generated inductor voltage; and
the slope voltage generating circuit unit generates the slope voltage having the slope defined by a function as follows:

(a resistance value of the sense resistor)×(the output voltage from the output terminal) /(inductance of the inductor).

4. The switching regulator according to claim 2, wherein:
the inductor current detecting circuit unit comprises
a sense resistor that is connected such that the inductor current flows therethrough, and
a current-voltage conversion circuit configured to generate the inductor voltage in accordance with the inductor current, based on a voltage between both ends of the sense resistor, and output the generated inductor voltage; and
the slope voltage generating circuit unit generates the slope voltage having the slope defined by a function as follows:

(a resistance value of the sense resistor)×{−(the output voltage from the output terminal)}/(inductance of the inductor).

5. The switching regulator according to claim 1, wherein the switching control circuit unit comprises:
an adding circuit configured to add the slope voltage to the inductor voltage output from the inductor current detecting circuit unit, and output the added voltage;
a voltage comparing circuit configured to compare the added voltage output from the adding circuit with the amplified voltage output from the error amplifying circuit unit to obtain the comparison result, and generate and output the pulse signal of the duty cycle corresponding to the comparison result;
a load condition detecting circuit configured to detect a condition of a load connected to the output terminal, based on the amplified voltage output from the error amplifying circuit unit, and to output a load condition signal corresponding to the detected condition;
an oscillating circuit configured to generate a clock signal having a predetermined pulse width according to the load condition signal output from the load condition detecting circuit, and output the clock signal; and
a control circuit configured to receive the clock signal from the oscillating circuit for turning on the first switch element and to receive the pulse signal from the voltage comparing circuit for turning off the first switch element, and to control the first switching operation of the first switch element according to the clock signal and the pulse signal, wherein:
the oscillating circuit stops outputting the clock signal while the load condition detecting circuit is outputting the load condition signal indicating that the load is in a light load condition.

6. The switching regulator according to claim 2, wherein the switching control circuit unit comprises:
an adding circuit configured to add the slope voltage to the amplified voltage output from the error amplifying circuit unit, and output the added voltage;
a voltage comparing circuit configured to compare the added voltage output from the adding circuit with the inductor voltage output from the inductor current detecting circuit unit to obtain the comparison result, and generate and output the pulse signal of the duty cycle corresponding to the comparison result;
a load condition detecting circuit configured to detect a condition of a load connected to the output terminal, based on the amplified voltage output from the error amplifying circuit unit, and to output a load condition signal corresponding to the detected condition;
an oscillating circuit configured to generate a clock signal having a predetermined pulse width according to the load condition signal output from the load condition detecting circuit, and output the clock signal; and
a control circuit configured to receive the clock signal from the oscillating circuit for turning on the first switch element and to receive the pulse signal from the voltage comparing circuit for turning off the first switch element, and to control the first switching operation of the first switch element according to the clock signal and the pulse signal, wherein:
the oscillating circuit stops outputting the clock signal while the load condition detecting circuit is outputting the load condition signal indicating that the load is in a light load condition.

7. The switching regulator according to claim 5, wherein:
the load condition detecting circuit compares the amplified voltage output from the error amplifying circuit unit with the predetermined reference voltage, and outputs the load conditional signal indicating the light load condition, in the event that the amplified voltage output from the error amplifying circuit unit is lower than the predetermined reference voltage.

8. The switching regulator according to claim 5, wherein:
the control circuit comprises an RS flip-flop configured to receive the clock signal from the oscillating circuit as a set signal and to receive the pulse signal from the voltage comparing circuit as a reset signal.

9. The switching regulator according to claim 1, wherein:
the rectification element comprises a second switch element configured to implement synchronous rectification for discharging the inductor by performing a second switching operation so as to be turned on/off according to a second control signal that has been input; and
the switching control circuit unit controls the first switching operation of the first switch element in such a manner that the output voltage output from the output terminal corresponds to the predetermined constant voltage, and sends the second control signal to the second switch element such that the second switching operation is performed in a reversed manner with respect to the first switching operation of the first switch element.

10. The switching regulator according to claim 9, further comprising: a reverse current preventing circuit unit configured to prevent a current from being provided to the second switch element in order to prevent a reverse current from flowing toward the second switch element from the output terminal, wherein: in the event that the reverse current or an indication of the reverse current flowing toward the second switch element from the output terminal is detected based on a voltage at a connection part of the first switch element and the inductor, the reverse current preventing circuit unit turns off the second switch element so as to be in a cutoff status, regardless of the second control signal from the switching control circuit unit.

11. The switching regulator according to claim 9, further comprising: a reverse current preventing circuit unit configured to prevent a current from being provided to the second switch element by cutting off a connection of the second switch element in order to prevent a reverse current from flowing toward the second switch element from the output terminal, wherein: in the event that the reverse current or an indication of the reverse current flowing toward the second switch element from the output terminal is detected based on a voltage at a connection part of the first switch element and the inductor, the reverse current preventing circuit unit cuts off the connection of the second switch element so that the current is prevented from being provided to the second switch element.

12. The switching regulator according to claim 11, wherein the reverse current preventing circuit unit comprises:
   a third switch element configured to perform a third switching operation so as to be turned on/off according to a third control signal input to a control electrode, whereby the third switch element is connected in series with the second switch element; and
   a reverse current detecting circuit configured to prevent the current from being provided to the second switch element by turning off the third switch element so as to be in a cutoff status, in the event that the reverse current or the indication of the reverse current flowing toward the second switch element from the output terminal is detected based on the voltage at the connection part of the first switch element and the inductor.

13. The switching regulator according to claim 1, wherein the slope voltage generating circuit unit is external to the switching control circuit unit.

14. The switching regulator according to claim 1, wherein the switching control circuit unit comprises an adding circuit configured to add the slope voltage to the inductor voltage output from the inductor current detecting circuit unit, and output the added voltage.

15. The switching regulator according to claim 2, wherein the switching control circuit unit comprises an adding circuit configured to add the slope voltage to the amplified voltage output from the error amplifying circuit unit, and output the added voltage.

16. The switching regulator according to claim 1, wherein the slope of the slope voltage is non-zero while the first switch is turned off and in the cutoff status.

17. The switching regulator according to claim 2, wherein the slope of the slope voltage is non-zero while the first switch is turned off and in the cutoff status.

* * * * *